US010305606B2

(12) United States Patent
Chang et al.

(10) Patent No.: US 10,305,606 B2
(45) Date of Patent: May 28, 2019

(54) REDUCTION OF UNMODULATED AMBIENT BLOCKERS IN REFLECTED DATA LINKS THROUGH MANIPULATION OR REPLICATION OF THE TRANSMITTING SIGNAL SOURCE

(71) Applicants: THE REGENTS OF THE UNIVERSITY OF CALIFORNIA, Oakland, CA (US); CALIFORNIA INSTITUTE OF TECHNOLOGY, Pasadena, CA (US)

(72) Inventors: Mau-Chung Frank Chang, Los Angeles, CA (US); Yanghyo Kim, Los Angeles, CA (US); Adrian J. Tang, Pasadena, CA (US)

(73) Assignees: THE REGENTS OF THE UNIVERSITY OF CALIFORNIA, Oakland, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/490,156

(22) Filed: Apr. 18, 2017

(65) Prior Publication Data
US 2017/0288787 A1 Oct. 5, 2017

Related U.S. Application Data

(63) Continuation of application No. PCT/US2015/055229, filed on Oct. 13, 2015.
(Continued)

(51) Int. Cl.
*G01S 13/32* (2006.01)
*H04B 15/00* (2006.01)
*H04B 1/40* (2015.01)
*H01Q 11/12* (2006.01)
(Continued)

(52) U.S. Cl.
CPC .......... *H04B 15/005* (2013.01); *G01S 13/32* (2013.01); *H01Q 11/12* (2013.01); *H04B 1/10* (2013.01);
(Continued)

(58) Field of Classification Search
CPC ...... G01S 13/32; H04B 1/10; G06K 7/10019; G06K 7/10386
(Continued)

(56) References Cited

U.S. PATENT DOCUMENTS

2007/0060075 A1   3/2007 Mikuteit
2007/0249314 A1  10/2007 Sanders
(Continued)

OTHER PUBLICATIONS

Korean Intellectual Property Office (KIPO), International Search Report and Written Opinion issued Jan. 27, 2016, counterpart PCT International Application No. PCT/US2015/055229, pp. 1-13, with claims searched, pp. 14-19.

*Primary Examiner* — Lee Nguyen
(74) *Attorney, Agent, or Firm* — O'Banion & Ritchey LLP; John P. O'Banion

(57) ABSTRACT

Communication between a wireless base-station and a microwave reflector link are enhanced by feeding back a portion of the transmitter signal, adjusted for phase and amplitude, to cancel ambient reflection blocker signals being received at the base-station. The microwave reflector link does not utilize a transmitter gain stage, but communicates data back to the base-station in response to modulating the reflections of its antenna (e.g., in gain and/or phase). The disclosure aids in the proper amplification and processing of reflection signals from the microwave reflector link, by canceling out the blocking signals which arise as background objects reflect transmitter signal energy back to the base-station.

30 Claims, 8 Drawing Sheets

Related U.S. Application Data

(60) Provisional application No. 62/066,833, filed on Oct. 21, 2014.

(51) Int. Cl.
   *H04B 1/10* (2006.01)
   *H04Q 5/22* (2006.01)
   *H04W 84/02* (2009.01)
   *H04W 88/08* (2009.01)
   *G01S 13/34* (2006.01)

(52) U.S. Cl.
   CPC ............... *H04B 1/40* (2013.01); *H04Q 5/22* (2013.01); *H04W 84/02* (2013.01); *H04W 88/08* (2013.01)

(58) Field of Classification Search
   USPC ........................................... 455/41.2
   See application file for complete search history.

(56) References Cited

U.S. PATENT DOCUMENTS

| | | | |
|---|---|---|---|
| 2009/0002131 A1* | 1/2009 | Chiu | H04Q 9/00 340/10.4 |
| 2009/0179740 A1 | 7/2009 | Pillai | |
| 2010/0120368 A1 | 5/2010 | Smith | |
| 2010/0148966 A1* | 6/2010 | Vuppala | G06K 7/0008 340/572.1 |
| 2011/0243200 A1* | 10/2011 | Kargl | H03M 1/1255 375/219 |
| 2011/0309969 A1 | 12/2011 | Gravelle | |
| 2014/0015642 A1* | 1/2014 | White | G06K 7/10168 340/10.1 |
| 2014/0145832 A1* | 5/2014 | Kim | G06K 19/07766 340/10.5 |

* cited by examiner

REDUCTION OF UNMODULATED AMBIENT BLOCKERS IN REFLECTED DATA LINKS THROUGH MANIPULATION OR REPLICATION OF THE TRANSMITTING SIGNAL SOURCE

CROSS-REFERENCE TO RELATED APPLICATIONS

This application is a 35 U.S.C. § 111(a) continuation of PCT international application number PCT/US2015/055229 filed on Oct. 13, 2015, incorporated herein by reference in its entirety, which claims priority to, and the benefit of, U.S. provisional patent application Ser. No. 62/066,833 filed on Oct. 21, 2014, incorporated herein by reference in its entirety. Priority is claimed to each of the foregoing applications.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

The above-referenced PCT international application was published as PCT International Publication No. WO 2016/064618 on Apr. 28, 2016, which publication is incorporated herein by reference in its entirety.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technological Field

This technical disclosure pertains generally to wireless data links, and more particularly to a method of eliminating a power amplifier from the transmitter chain in a wireless data link, while overcoming the effects of ambient reflections.

2. Background Discussion

WiFi and WLAN technology (IEEE 802.11 a, b, g, n, ac, ad) have been very effective in the mobile market (e.g., phones, tablets and portable gaming). However, the high power consumption of existing WiFi transceiver technology is proving to be unsuitable for the emerging wearable device market (e.g., Google Glass, Samsung Galaxy Gear, Apple Watch, etc.). One core reason why power consumption is limited is because the WLAN transceiver (currently implemented at either 2.4 or 5.83 GHz) requires a power amplifier device to generate power levels suitable for transmitting a WiFi signal to a base-station or router. State-of-art power amplifiers remain only 10% efficient in typical cases with best reported performance not exceeding 15%. Thus, in order to generate the typical 100-250 mW required to send a WiFi signal, the device must consume on the order of 1000-2500 mW, definitely not compatible with wearable products where the battery is so small and simply cannot support such high power levels.

In a prior application by the inventors, a technology was described that eliminated power amplifiers from a remote module (e.g., wearable device) configured as a reflection module, thus enabling implementation of a WLAN or WiFi link that consumes a factor of 10-100× (one to two orders of magnitude) less power. However, the overall communication performance could still be heavily limited by receipt of ambient carrier reflections which appears as an in-band signal blocker (blocking signal) or jammer.

Accordingly, a need exists for a reflection module that eliminates the need of a power amplifier while it overcomes the effects of ambient reflections.

BRIEF SUMMARY

Communication between a base-station and a microwave reflector link is enhanced by overcoming the blocker problem. The microwave reflector link communicates data back to the base-station by modulation of the signal reflection on its antenna, such as by changing termination or antenna configuration (e.g., reflection phase and/or amplitude). The blocker problem arises as reflections from background structures is significantly larger than the reflection from the microwave reflector link, thus making amplification and detection of modulation difficult.

To overcome this blocker problem an additional circuit pathway is introduced between the illumination TX and RX within the base-station. The pathway contains a programmable phase delay from 0 to 360° in cascade with a variable attenuator. The output of this extra pathway is combined with the receiver antenna signal, such as utilizing a power or signal combiner. The base-station adjusts phase delay and attenuation in this circuit pathway to compensate (i.e., destructive interference) for ambient reflections received on the receiving antenna. With removal of the large blocking signal, the receiver is able to amplify modulated reflection signals (arising from reflective modulation) and readily extract data sent by the microwave reflector link.

Applications of the present technology include, but are not limited to, the wireless connectivity market: WLAN, WiFi, Bluetooth and Cellular devices. Other possible applications exist for mm-wave standards like 802.11ad and 802.15.3c. Lower frequency applications may also exist for UHF and the pager band (433 MHz). Additionally, the technology could play some role in the upcoming 5G cellular standard (possibly at 15 GHz or even 30 GHz).

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION

1. Reduction of Ambient Blockers in Reflected Data Links

In a prior application by the inventors a new apparatus and method were described for using reflective data links to eliminate the need of power amplifiers in the transmitters of wearable devices or other mobile devices to join a WiFi or WLAN network as generally described in Section 2.

In this disclosure key properties are described which have been found to limit the performance of the original reflective link (data rate, transmission distance), with apparatus and methods described for overcoming those performance limitations.

Figure 1:
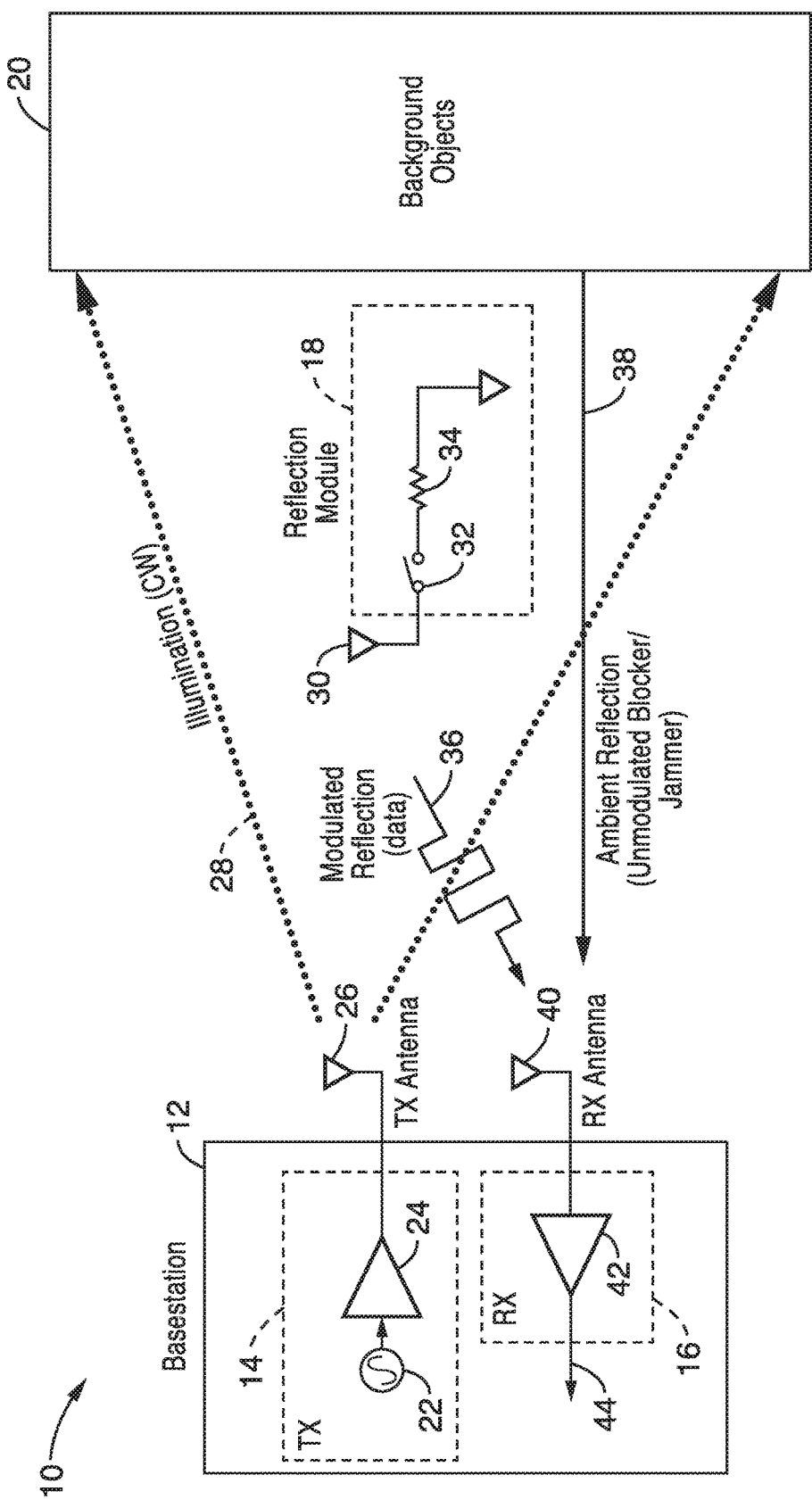
FIG. 1 is a block diagram of an ambient reflection blocker signal arising in a reflection-based communication link.

FIG. 1 depicts a reflective link scenario 10 as previous described by the inventors in which power from a transmitter 14 of a base-station 12 is received by the reflector module 18, allowing it to operate and communicate through antenna 30 back to receiver 16 in base-station 12.

In particular, base-station 12 is seen with a transmitter (TX) 14 shown with a source 22 coupled to an amplifier 24 which outputs to an antenna 26 generating illumination 28. The antenna 30 of reflection module 18 receives illumination 28 and responds by modulating the antenna loading through switching means 32 and impedance 34, to produce modulating reflections 36. A background object 20 is also present which receives illumination 28 and creates ambient reflection 38 (blocking signal).

The modulated reflection 36 from the reflection module 18, along with ambient reflection 38 are both received by receiver 16 at its antenna 40 which is coupled to an amplifier 42 and outputs a signal 44.

It will be recognized that a much larger portion of the transmitted power falls not on the reflector, but on other background objects 20 within the environment (e.g., floor, ceiling, walls, and so forth), which reflect the RF power back to the base-station receiver. The power from the ambient reflections (blocker power) is unmodulated and appears as a CW-tone directly in the center of the received bandwidth.

As the majority of the power at the receiver input is this blocker power (well over 99.99%), it overwhelms the receiver front-end through a well-known process called receiver desensitization. The low noise amplifier (LNA) or mixer in the front end of the receiver becomes saturated and exhibits an apparent drop in gain and noise figure performance. In essence the unmodulated CW tone or ambient reflection acts like a jammer or in-band blocker, thereby limiting link performance).

Figure 2:
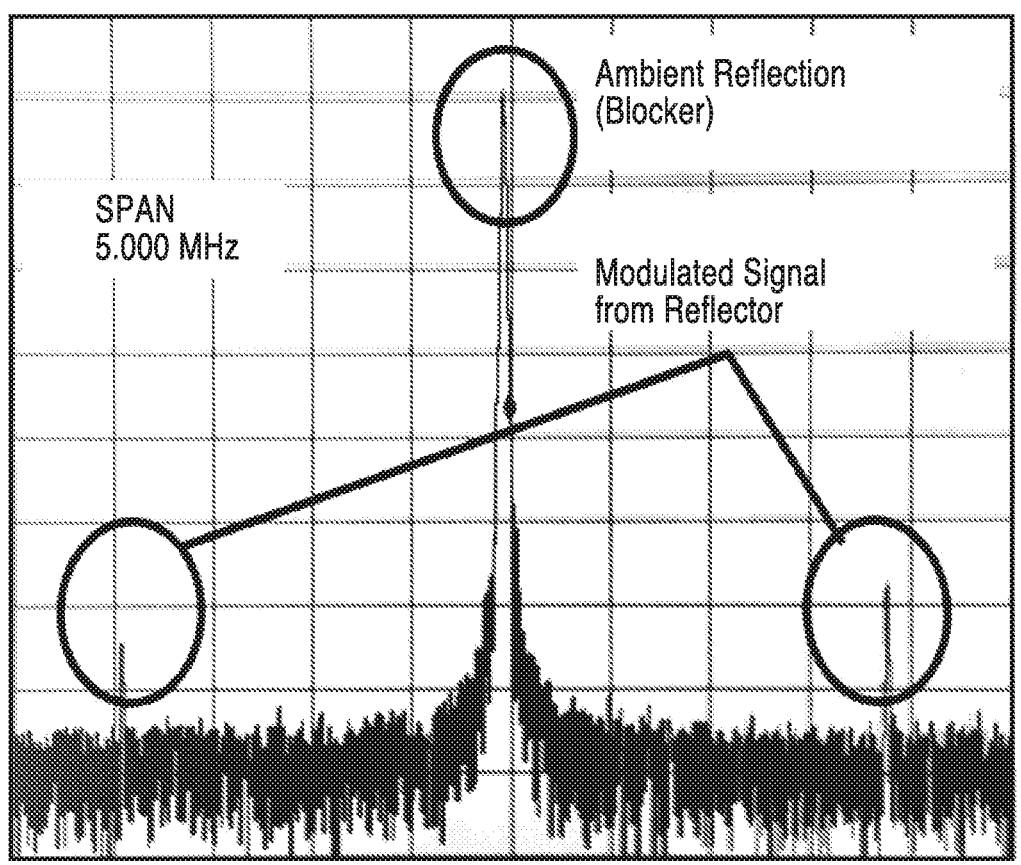
FIG. 2 is a plot of a measured ambient reflection blocker signal in a reflective based communication link.

FIG. 2 depicts the received signal containing the modulated signal fro the reflectors and the ambient reflection (blocker) signal. It is seen in the plot that the blocker signal 38 is over 30 dB stronger than the small ASK modulated signal 36 produced by reflector module 18.

Figure 3:
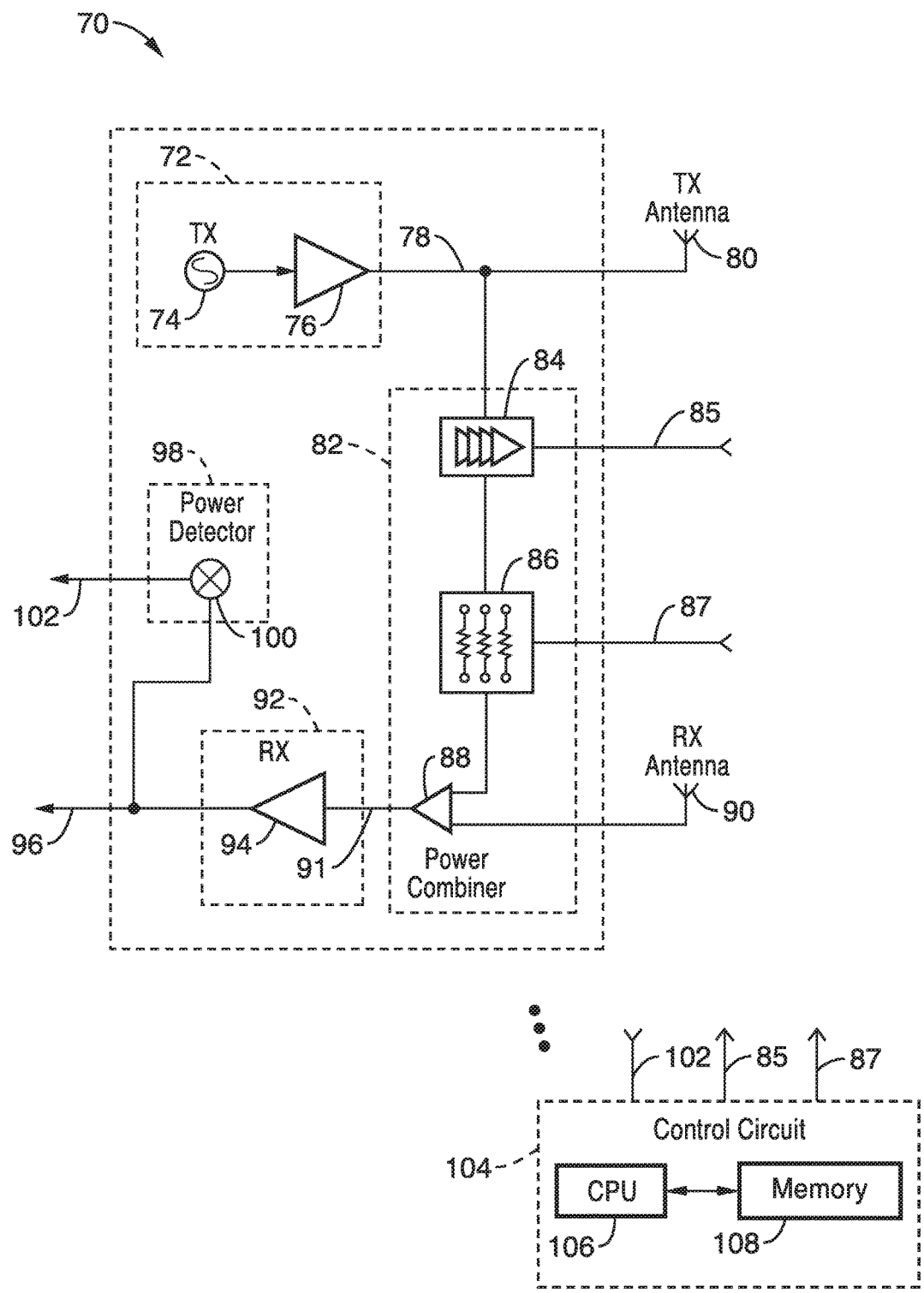
FIG. 3 is a block diagram of a microwave base-station with an added signal pathway to overcome the blocker signal in a reflection-based data-link according to an embodiment of the disclosed technology.

FIG. 3 illustrates an example base-station embodiment 70 which overcomes the blocker problem by incorporating an additional circuit pathway 82 between the illumination TX and RX within the base-station. In particular, the figure depicts the transmitter 72 having a signal source 74 coupled to amplifier 76 directed through output 78 to antenna 80. An additional pathway 82 (reverse blocking pathway) is coupled from the output 78 of the transmitter to the input 91 of receiver 92. The reverse blocking pathway 82 contains a programmable phase delay 84, such as from 0° to 360°, in cascade with a variable attenuator 86, which is coupled at a power combiner 88 (e.g., power or signal combiner) with the signal from receiver antenna 90. Thus, receiver 92 receives the signal from RX antenna 90 and a signal passing from the TX antenna through pathway 82. The receiver processes signal 91, such as exemplified with amplifier 94 and outputs the received signal 96. Furthermore, in this embodiment a monitoring block 98 is seen having a power detector 100, and outputting signal 102 as a monitor of the power. By way of example and not limitation, the power detector may comprise an integrator, a self-mixer, heterodyne receiver, or any means for monitoring the total power of the receiver signal to aid in the control loop for minimizing the IF power by setting both the amplitude and phase to optimize cancelation of the blocking signal.

In at least one example embodiment, the value for the programmable phase delay is set to match the phase of the ambient reflection, such as adjusting phase to reduce the received signal level. Similarly, the attenuator level can be adjusted until the signal level is minimized, thus counteracting the ambient reflection signal. The attenuation and phase delay can be set in any order or even simultaneously.

The base-station operates by adjusting the setting on the reverse blocking pathway 82 (attenuation or gain, and phase) so that its own contribution to the receiver output is exactly the same as the amplitude of the ambient blocker, however the phase is 180 degree (inverted) offering cancellation of the blocker signal. These signals can be adjusted either manually, or through monitoring of the power detector placed at the output of the receiver.

It will be appreciated that the extent of the blocking signal being received can be generally determined in response to checking the output signal 96 from the receiver, such as for blocking signal saturation, or other cues indicating the extent of the blocking signal. This measure can be utilized for controlling the adjustments to the phase and attenuation of the reverse blocking circuit.

As the blocker power is so much larger than the modulated reflection, one embodiment adjusts pathway 82 in response to simply monitoring the total output power of the receiver and independently adjusting each of the attenuator and phase shifter settings until the minimum level of receiver output power is reached. The current embodiment determines output power of the receiver by using a form of power detector circuit. It should be appreciated that this circuitry is not technology specific and can be implemented in a number of device forms and technologies, including use of discrete devices, modular approaches, one or more integrated-circuits, or other approaches without limitation.

Control circuitry is utilized for controlling variable phase shifter 84 and programmable attenuator 86 to counteract the blocking signal. One of ordinary skill in the art will recognize that a control circuit may be implemented in numerous ways. By way of example and not limitation, the figure depicts this control circuitry 104 as a computer processor (CPU) 106 and memory 108. The control circuit receives at least the output 102 from the power detector, and outputs control signals 85, 87 to the phase shifter 84, and programmable attenuator 86, respectively. The enhancements described in the presented technology can be readily controlled by various known forms of control circuitry, including discrete logic, logic arrays, gate arrays, and processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein to control the operation of the reverse blocking signal pathway to null out the effects of the ambient reflections, thus preventing them from swamping (desensitizing) the receiver. The presented technology is non-limiting with regard to memory and computer-readable media, insofar as these are non-transitory, and thus not constituting a transitory electronic signal.

The following section was contained as Appendix A in the provisional patent application to which this patent application claims filing priority, and provides information about the general approach of using reflective links for eliminating a power amplifier in a wearable device.

2. Microwave Reflector Link 2.1 Short Range Link Background

Short range (local) communication links such as WLAN and similar data links (e.g., WLAN, WiFi, Bluetooth, Cellular links, and so forth) typically require a power amplifier to be incorporated in the transmitter or integrated within what is termed the "WLAN user" (wireless local area network user), which is the device connected to a WiFi or other network, such as cellular phone, tablet, laptop or wearable device.

Figure 4:
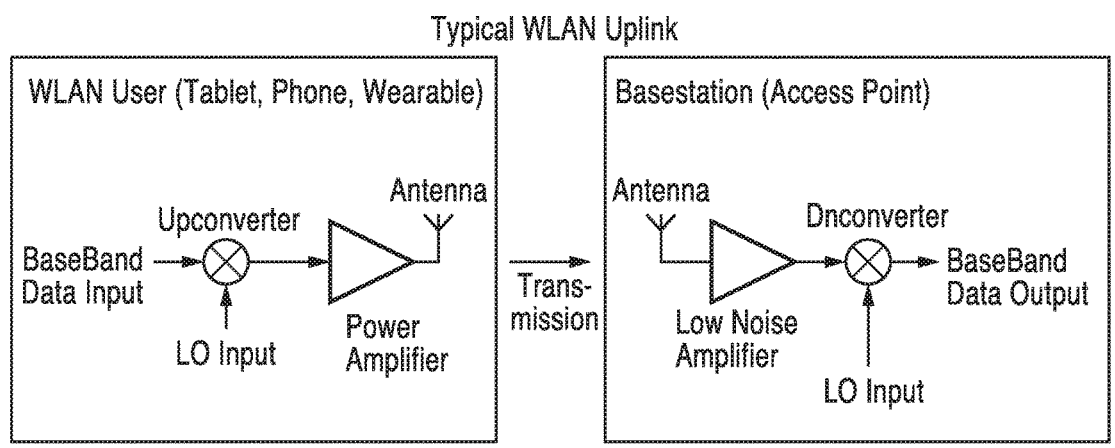
FIG. 4 is a block diagram showing a typical existing WLAN, WiFi, Bluetooth or cellular link.

FIG. 4 depicts a basic block diagram of a typical WLAN uplink showing a WLAN user (e.g., tablet, phone, or wearable) having a baseband data input to an upconverter receiving a local oscillator (LO) input. The output of the mixer (upconverter) is input to a power amplifier whose output drives an antenna to generate transmission to the base-station (access point). The access point receives transmissions on its antenna, which is passed through a low noise amplifier, before being downconverted, in response to receipt of a LO input, to generate a baseband data output.

WiFi and WLAN technology (IEEE 802.11 a/b/c/g/n/ac/ad) have been very successful in the mobile market (e.g., phones tablets and portable gaming). However, the high power consumption of existing WiFi transceiver technology is proving to be unsuitable for the emerging wearable device market (e.g., Google Glass, Samsung Galaxy Gear, Apple Watch, and the like). One core reason causing this high power consumption, and limiting applicability of the technology, is because the WLAN transceiver (e.g., currently implemented at either 2.4 or 5.83 GHz) requires a power amplifier device to generate power levels suitable for transmitting a WiFi signal to a base-station or router. Current state-of-the-art power amplifiers remain at about 10% efficiency in typical cases with best reported performance not exceeding about 15%. This lack of efficiency translates to consuming on the order of 1000-2500 mW to generate a typical WiFi signal of 100-250 mW. This high level of power consumption is generally not compatible with wearable products (e.g., such as Google glass) where the battery is typically meager and thus unable to support high power dissipation levels.

Accordingly, a need was seen for a method, apparatus and/or system for reducing power consumption in these wireless devices, as discussed herein.

2.2 Introduction to Use of Reflective Links

A reflective link is presently disclosed which eliminates the need for a power amplifier in the transmitter chain within the transceiver on the wearable device side of the data-link. Eliminating the transmitter enables implementation of a WLAN or WiFi link that consumes a factor of ten to one-hundred times (10×-100×) less power on one side of the data-link, and thus which is particularly well-suited for use on the wearable device side in which power is significantly more limited.

Applications of the present technology include, but are not limited to, the wireless connectivity market comprising WLAN, WiFi, Bluetooth, and Cellular connectivity. Other possible applications exist for mm-wave standards like 802.11 AD and 802.15.3 C. Lower frequency applications may also exist for UHF and the pager band (e.g., 433 MHz). Additionally, the technology could be applicable in the upcoming 5G cellular standard, such as at possibly 15 GHz or even 30 GHz. The present disclosure, however, is not limited to use in the above examples, as it will be appreciated that short range (local) wireless communications are found in an increasing number of electronic applications.

2.3 Microwave Reflector Link System

Figure 5A:
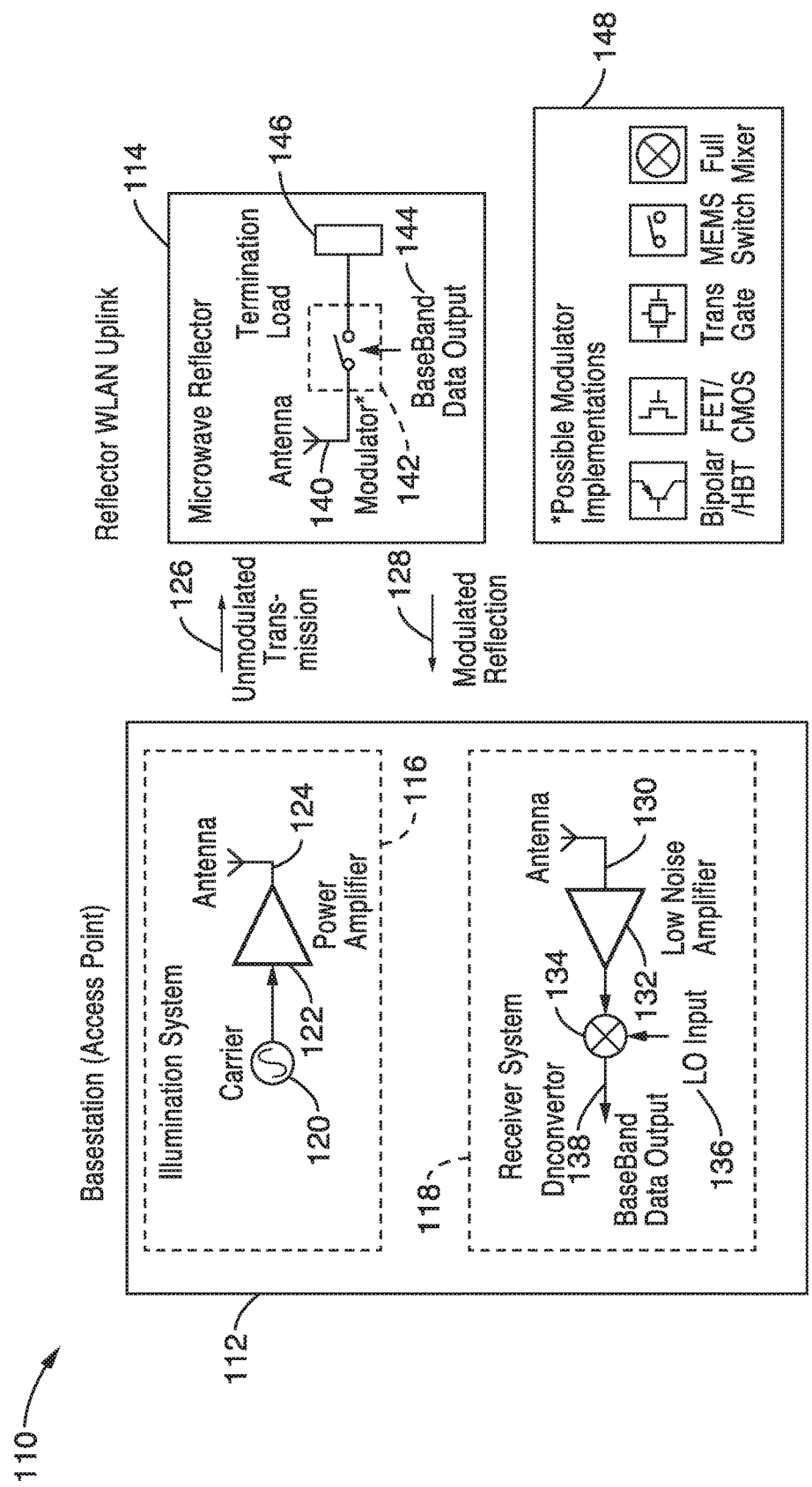
FIG. 5A and FIG. 5B is a block diagram showing a microwave reflector link (MRL) for WiFi, WLAN, Bluetooth, Cellular and other data-links according to an embodiment of the disclosed technology.
Figure 5B:
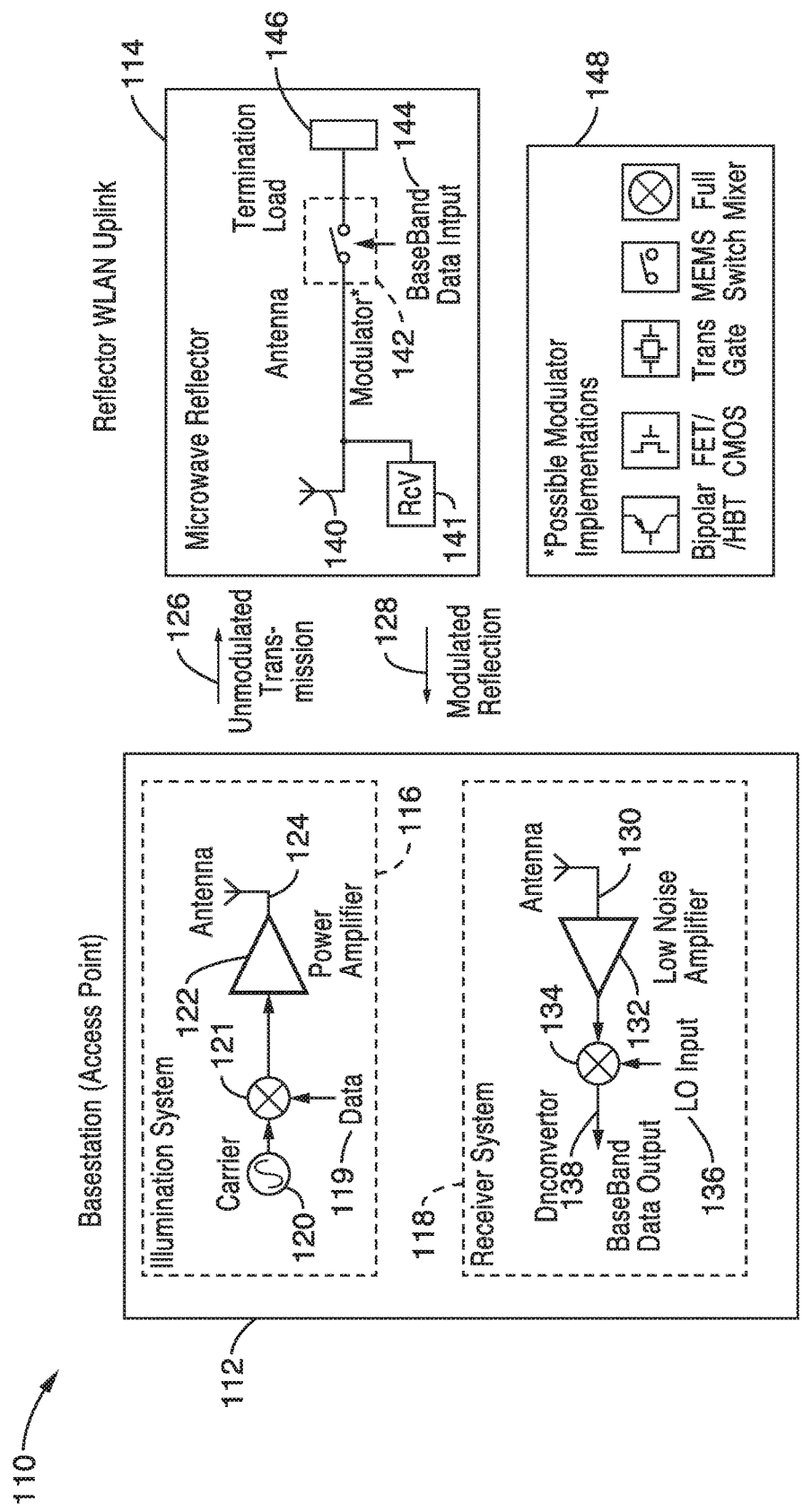

FIG. 5A and FIG. 5B illustrate example embodiments 110 of a microwave reflector link (MRL), that can overcome the need to carry the power amplifier and its high power consumption in a wearable or other device. For the sake of convenience, all the embodiments of the present disclosure are described as being at microwave frequencies, however, it will be appreciated that the present disclosure can be implemented to operate at very high RF frequencies as well (e.g., UHF and in some applications even VHF).

In FIG. 5A a base-station (access point) 112 is seen along with a microwave reflector 114. By way of example and not limitation, the reflector link is seen as a short range (local) wireless uplink, which is often referred to generically as a WLAN. The MRL is particularly well-suited for use in specific communication systems, such as WiFi, WLAN, Bluetooth, Cellular and other data-links. The example system depicts three main components described below, but is not limited to systems having these specific components.

A microwave illuminator 116 is seen at or within base-station 112 (access point), wireless router, or other wireless network access point end which provides the RF/microwave power used to illuminate or excite a reflector module 114. The illuminator is shown with a carrier generation circuit 120 coupled into a power amplifier 122 whose output is directed to an antenna 124. Illuminator 116 transits continuous-wave (CW) power 126 at a microwave frequency which will be modulated by the reflector module 114.

A microwave reflector 114 in this example is placed at, within, or integrated into a wearable device. The reflector captures microwave power on its antenna 140 as sent by illuminator 116 and either reflects or absorbs the incident radiation depending on the termination condition of the antenna, which is set by modulator 142. The microwave reflector link (MRL) is seen in reflector 114 with antenna 140 coupled through a modulator 142, whose state is modulated by a baseband data input 144, with modulator 142 coupled to a termination load 146.

The modulator of this reflector can be implemented in a variety of different ways 148 as will be known to one of ordinary skill in the art. By way of example and not limitation, the modulator can be implemented in a number of ways, including use of a single switching device, such as a single transistor (e.g., Bipolar, HBT, CMOS, HEMT), other three terminal device, a transmission gate, a full mixer (passive, resistive or Gilbert cell), or even as MEMS or other mechanical switches.

The base-station 112 contains a microwave receiver 118, placed at, or within a router, base-station or other wireless network access point. Receiver 118 is seen with antenna 130 coupled to a low-noise amplifier 132 with an output coupled to a downconverter 134 with local oscillator (LO) input 136, which generates a baseband data output 138. The receiver captures the modulated reflection from the reflector module and converts it back to baseband data through a down-conversion process. The down-conversion process is known in the art and found in WiFi or other wireless links.

In FIG. 5B an embodiment 110 of the MRL is shown for the case in which data is being transmitted from the illumination system to the MRL. One of ordinary skill in the art will appreciate that the signal driving the illuminator transmission may be mixed with outgoing data, such as mixed, time-duplexed, and so forth, so that data can be carried to the wearable end of the link. In the figure, a modulator (mixer) 121 is shown mixing output from the carrier signal 120 with data 119 to be transmitted to the MRL. At MRL 114 a receiver section 141 is shown coupled to the antenna 140, and would be configured with receiver and demodulator circuitry. The remaining elements are as described in FIG. 5A.

In FIG. 5B the receiver is configured with sufficiently high impedance that it does not adversely impact the state changes between reflection and absorption of the antenna which is being utilized to communicate back to the illumination system. One of ordinary skill in the art will recognize that there are numerous ways to interpose, encode, mix, and/or modulate data within an outgoing microwave signal, and to receive and decode that data on the reception side, any of these techniques and combination thereof may be utilized herein without departing from the teachings of the present disclosure. In addition, it should be appreciated that the inclusion of a data communication path from illuminator to MRL reflector is applicable to all of the embodiments of the present disclosure. Accordingly, for the sake of simplicity of illustration, data communication between illuminator and MRL is not shown in the subsequent embodiments described herein.

2.4 Operation of Microwave Reflector Link

The illuminator 116 of FIG. 5A and FIG. 5B shines (directionally emits) a continuous wave (CW) signal 126 from antenna 124 at microwave (or RF) frequencies in the direction of the microwave reflector from a base-station, or other network access point. The directionality of transmission 126 can be accomplished with a horn antenna, patch antenna, or other similar high-gain (exceeding 5 dBi) structure. Generation of the carrier can either be through use of a phase-lock loop or other synthesizer, or even a free running oscillator. A power amplifier 122 may or may not be required in the illuminator to meet link signal-to-noise ratio (SNR) requirements. In at least one embodiment, the illuminator is time duplexed, or otherwise mixed, to also carry data as was seen in FIG. 5B, such as by adding a mixer to mix in the data prior to transmission, however, this is not required for basic operation.

The microwave reflector 114 is preferably placed at, placed on, or placed within, (i.e., placed at, coupled to, or integrated within) the wearable device. Once the transmitted power arrives at microwave reflector 114, modulator 142 modifies the termination condition, as non-terminated or terminated through load 146, according to the data pattern to be sent which is shown in response to baseband data input 144, to produce modulated reflection signal 128. It will be noted that modulator 142 is modulated with the data to be returned to the base-station, (or network access point). Explaining this process in terms of a simple switch, when the modulator is in the open condition, the antenna is essentially unterminated and reflects a large portion of the power back to the base-station. When the modulator is in the closed condition, the antenna is connected to the termination load, and very little power is reflected. In this way modulation can be accomplished. The termination can be implemented as a stub, transmission line or even lumped element circuit design. It should be noted that the termination condition can be made complex to enable reflection of multiple different phases and amplitudes to enable QAM operation. Accordingly, communication link is established back from the WLAN in response to the power reflected back to the base-station or network access point, as the microwave reflector link 114 modulates 142 the termination condition of the antenna 140 according to the data pattern 144 to be sent.

As the modulator is controlled by the incoming data, the signal reflected to the receiver at the base-station or network access point will be modulated by the data applied to the modulator input. It should be appreciated that this data may be in either a positive or negative sensing polarity depending on both the modulator configuration, and geometric placement of both the base-station (or network access point) and the wearable device or other WLAN user containing the reflector with modulator. Interference of unmodulated reflection from other background or foreground objects also affects the polarity depending on the relative strength of these reflections when compared to the modulated signal.

It should be appreciated that in all the embodiments of the present disclosure, the modulator may be configured to provide more than two different reflection levels, such as based on more than the two different termination conditions of non-terminated or terminated. Thus, data can be alternatively communicated as bits with three states, four states, or even more states depending on the number of different reflection levels incorporated. However, generally speaking the signal to noise ratio will be reduced as the number of reflection states supported increases beyond two.

2.5 Alternative Non-Coherent Link Reflector

Figure 6:
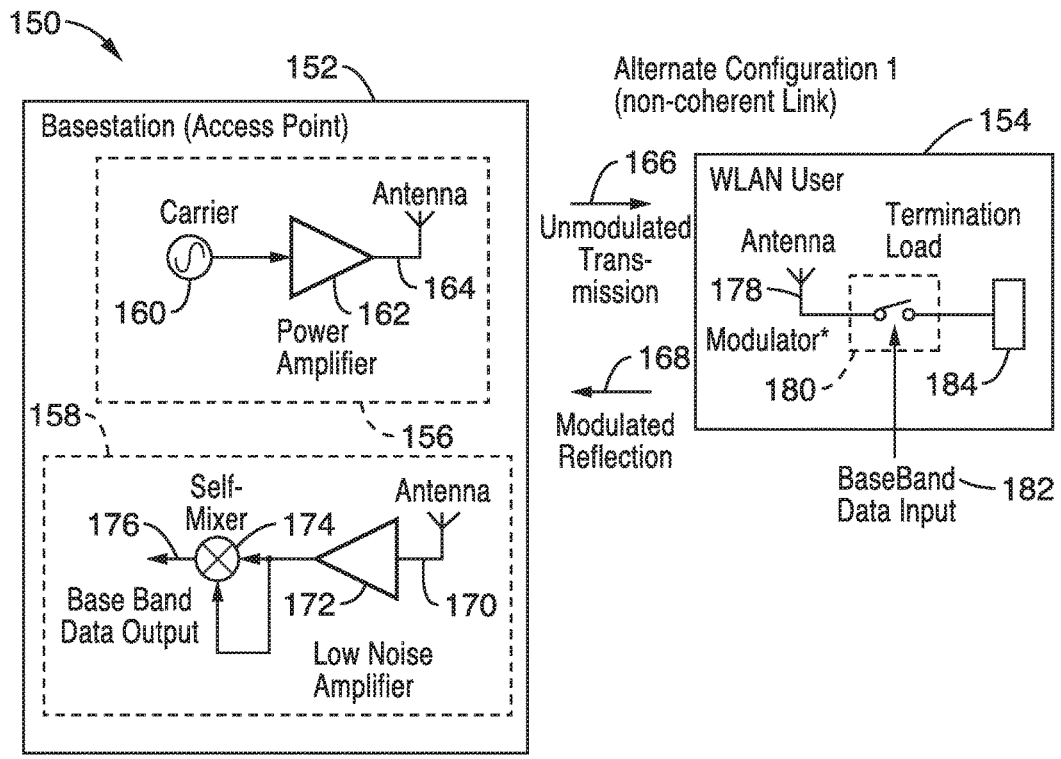
FIG. 6 is a block diagram showing a microwave reflector link (MRL) for WiFi, WLAN, Bluetooth, Cellular and other data-links in a non-coherent configuration according to an embodiment of the disclosed technology.

FIG. 6 illustrates an example embodiment 150 of an alternative reflective microwave data-link 154 configured in a non-coherent configuration. In this case, the coherent down-conversion with local oscillator (LO) signal (within the receiver) is replaced with a self-mixer or other power detector (Rectification based, push-push based, or full Gilbert cell) and the carrier generation in the illuminator can be either coherent (phase-locked) or free running.

In particular, the figure depicts a base-station (access point) 152 configured for establishing a non-coherent link with a WLAN user 154. A transmitter 156 is seen with carrier 160, amplified 162, to antenna 164 for generating an unmodulated transmission 166 directed toward WLAN user 154. The reflective link 154 is seen with antenna 178 coupled through modulator 180, modulated by base band data input 182, to a termination load 184. The modulated reflection 168 from the WLAN user is received at receiver 158 by an antenna 170 coupled to a low noise amplifier 172 coupled to a self-mixer 174, which outputs a base band data output 176.

The microwave reflector and modulator combination need not be based on termination condition. Thus, any switch or modulator placement which influences the reflection can be utilized in this and other embodiments of the present disclosure without departing from its teachings.

2.6 Alternative Dynamic Reflector Link

Figure 7:
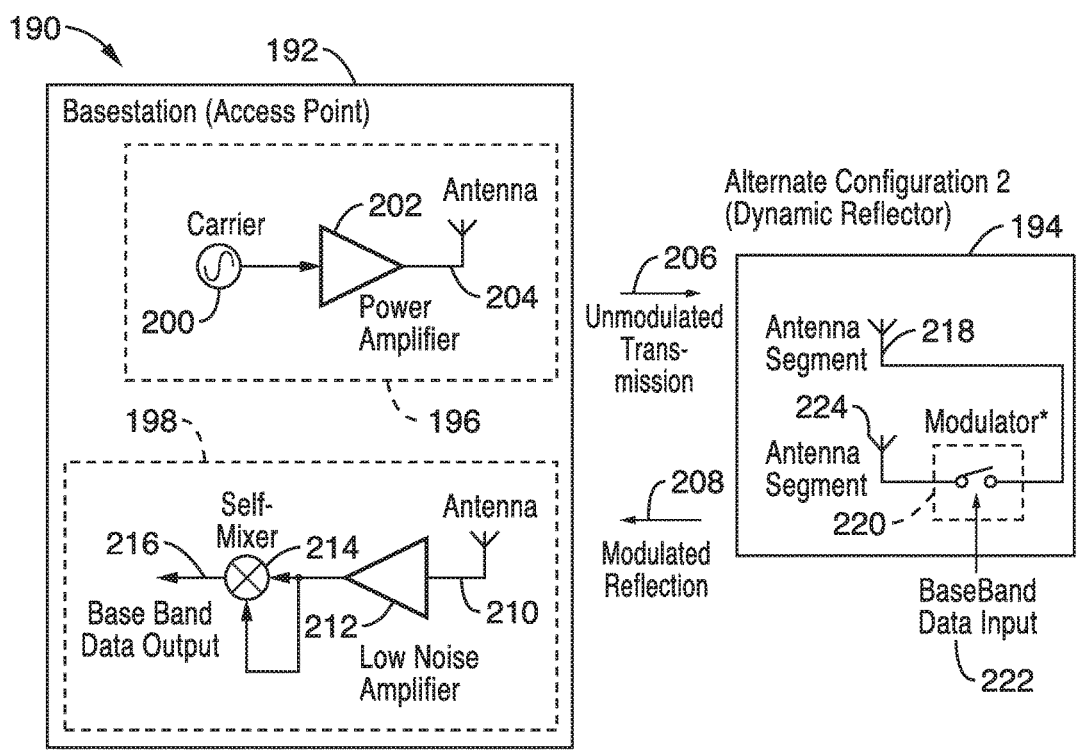
FIG. 7 is a block diagram showing a microwave reflector link (MRL) for WiFi, WLAN, Bluetooth, Cellular and other data-links using a dynamic reflector according to an embodiment of the disclosed technology.

FIG. 7 illustrates an example embodiment 190 in which a base-station (access point) 192, having a transmitter 196 and receiver 198, generates an illumination signal to microwave data-link 194 as a dynamic reflector. In this example the transmitter of base-station (access point) 192 is exemplified with a carrier 200 coupled through an amplifier 202 to an antenna 204 to generate unmodulated transmission 206 to the WLAN user 194.

The transmissions are received in reflector 194 on a first antenna segment 218 coupled through a modulator 220, modulated by a base band data input 222, to a second antenna segment 224 from which a modulated reflection 208 is generated back to the receiver 198 in base-station (access point) 192. Modulated reflections are received by antenna 210 in receiver 198, then amplified 212 and output to a self-mixer 214 to output a base band data output 216.

By way of example and not limitation a prototype link was implemented comprising two antenna sections connected together (e.g., over-moded dipole antennas) using the modulator (connected in a first state and disconnected in a second state). The two sections need not utilize the same type of antenna. It should also be appreciated that any desired type of modulator and any desired type of antenna structure (horn, patch, dipole, monopole, loop) and even using antenna arrays, may be utilized in this and other embodiments of the present disclosure.

Additionally, more than two antenna segments can be implemented with any possible number of array sections and any possible number of modulators connecting and disconnecting them. It is important, however, that the reflection co-efficient of the overall microwave reflector is changed (modulated) by the modulator action. It should be noted that the modulator in this embodiment, and all embodiments described herein, is not limited to binary states (two states), as multiple analog states (e.g., for QAM or PAM operation) can be utilized without departing from the present disclosure. It will also be appreciated that at least one embodiment utilizes frequency modulating of the reflector to provide orthogonal frequency division multiplexing (OFDM) operation.

Figure 8:
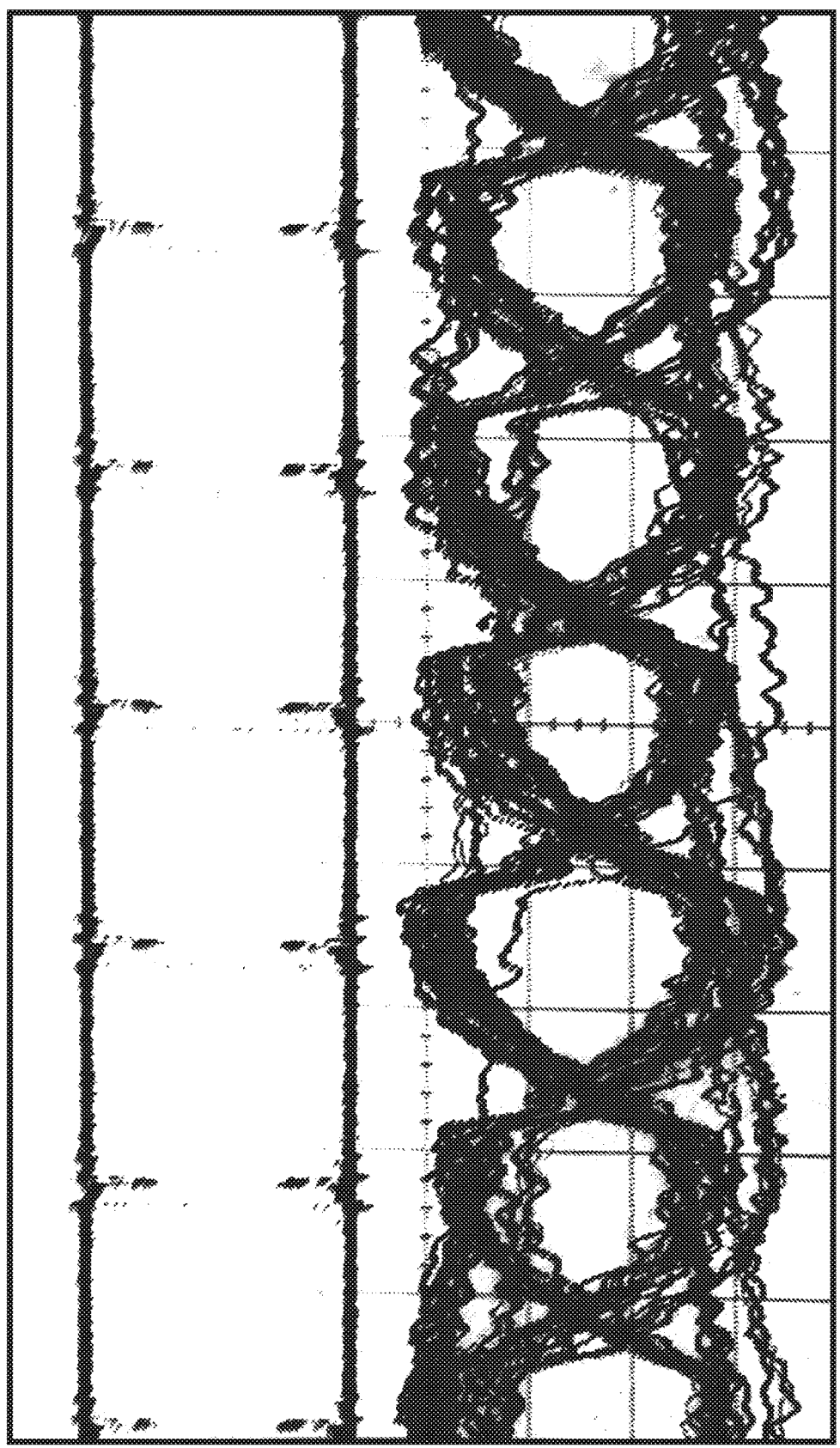
FIG. 8 is a plot of data transmission (eye-diagram) in the reflector link shown in FIG. 7.

FIG. 8 illustrates data transmission obtained in the above test seen in FIG. 7 depicting an eye-diagram with a data-rate of 3.0 Mb/s. It should be appreciated that the present disclosure is in no way limited to these depicted low transmission speeds, as these speeds were only chosen for convenience based on what test equipment was readily available for testing the technology.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. A wireless base-station apparatus which cancels ambient reflection blocker signals of a reflection-based data-link, the apparatus comprising: (a) a transmitter of a wireless base-station, said transmitter having a transmitter antenna output for being directed to a reflection-based data link; (b) a receiver of said wireless base-station, said receiver having a receiver antenna input configured for receiving modulated reflections of the transmitter antenna output from a reflection-based data-link configured for communicating data back to said wireless base-station; (c) a circuit pathway in said wireless base-station between said transmitter antenna output and said receiver antenna input, with said circuit pathway having a programmable phase delay in series with a variable attenuator; (d) wherein said wireless base-station is configured for adjusting the phase of said programmable phase delay and attenuation of said variable attenuator to couple a signal into said receiver which compensates for ambient reflections received on said receiving antenna, thus allowing said receiver to amplify modulated reflections from the reflection-based data-link while rejecting ambient reflection blocker signals.

2. The apparatus of any preceding embodiment, wherein said circuit pathway is connected to said receiver antenna input through a power or signal combiner.

3. The apparatus of any preceding embodiment, wherein said circuit pathway can be adjusted either manually, or through monitoring output power of said receiver.

4. The apparatus of any preceding embodiment, further comprising a power detector configured for monitoring power output of said receiver to determine extent of ambient reflection blocker signals in adjusting said circuit pathway rejecting these ambient reflection blocker signals.

5. The apparatus of any preceding embodiment, wherein by adjusting phase and attenuation or gain, a signal can be introduced to said receiver antenna input with an amplitude approximately matching that of ambient reflection blocker signals, yet having a phase difference of approximately 180 degrees, whereby the signal introduced to said receiver antenna input cancels all or a portion of the ambient reflection blocker signal.

6. The apparatus of any preceding embodiment, wherein the reflection-based data-link is configured for communicating data back to said wireless base-station without requiring a power amplifier to drive an output transmission, as these output transmissions are driven in response to a state of termination of an antenna of the reflection-based data-link which determines extent to which signals from the reflection-based data-link are reflected back to be received by said wireless base-station.

7. The apparatus of any preceding embodiment, wherein termination state of the antenna of the reflection-based data-link is modulated between a non-terminated open condition, or a terminated condition connected to a termination load.

8. The apparatus of any preceding embodiment, wherein termination state of said antenna of the reflection-based data-link is modulated between multiple different antenna configurations.

9. The apparatus of any preceding embodiment, wherein said multiple antenna configurations comprise connection of said antenna as a first antenna segment, with a modulated connection to at least a second antenna segment.

10. The apparatus of any preceding embodiment, wherein said transmitter of said wireless base-station is configured for being supplied a microwave signal source which is either modulated with outgoing data to be received by the reflection-based data-link, or left unmodulated without outgoing data to be received by the reflection-based data-link.

11. The apparatus of any preceding embodiment, wherein said wireless communication by said wireless base-station is selected from a group of wireless communication types consisting of Wi-Fi, WLAN, Bluetooth, and Cellular communications.

12. The apparatus of any preceding embodiment, wherein said transmitter of said wireless base-station is configured to transmit continuous wave (CW) power at a microwave frequency which will be modulated by the reflection-based data-link, whose reflected signals are received at the receiver of said wireless base-station.

13. The apparatus of any preceding embodiment, wherein said wireless base-station is configured for communicating with the reflection-based data-link which is placed at, coupled to, or integrated within a wearable electronic device.

14. The apparatus of any preceding embodiment, wherein said wireless base-station is configured for communicating with the reflection-based data-link which is configured for modulating an amount of phase change exhibited in its different termination states, and reflecting a signal back to the receiver of said wireless base-station.

15. An apparatus for wirelessly communicating data with a remote link, comprising: (a) a microwave base-station having a microwave transmitter coupled to a transmitting antenna and a microwave receiver coupled to a receiving antenna; (b) wherein said microwave transmitter is configured for generating a microwave illumination toward a microwave link, and for receiving a signal reflected from the microwave link which modulates signal reflection level and/or phase to encode data within the reflected signal; (c) a reverse blocking circuit connected between said transmitting antenna and said receiving antenna, said reverse blocking circuit configured for extracted a portion of the transmitted output, changing its phase and attenuation, to then combine this at the receiving antenna side with the reflected signal received at the receiving antenna; and (d) a control circuit configured for adjusting the phase and attenuation in said reverse blocking circuit to produce a signal into the receiver which compensates for ambient reflections received on the receiving antenna as a blocking signal, thus allowing the receiver to amplify modulated reflections from the microwave link while rejecting the blocking signal.

16. The apparatus of any preceding embodiment, wherein said reverse blocking circuit comprises a variable phase shifter in series with a variable attenuator.

17. The apparatus of any preceding embodiment, wherein said variable phase shifter in series with said variable attenuator of said reverse blocking circuit are connected to the receiver antenna input through a power or signal combiner, which is configured to combine the signal from the reverse blocking signal with that being received from the receiver antenna.

18. The apparatus of any preceding embodiment, wherein said reverse blocking circuit can be adjusted either manually, or through monitoring output power of the microwave receiver.

19. The apparatus of any preceding embodiment, further comprising a power detector configured for monitoring power output of the microwave receiver in the base-station to aid in adjusting the reverse blocking circuit to maximize rejection of ambient reflection blocker signals.

20. The apparatus of any preceding embodiment, wherein the microwave link is configured for communicating data back to said wireless base-station without requiring a power amplifier to drive an output transmission of the microwave link, because output transmissions are driven in response to state of termination of the antenna of the microwave link which is sensed in the reflected signal reaching said microwave receiver of said wireless base-station.

21. The apparatus of any preceding embodiment, wherein termination state of the antenna of the microwave link is modulated between a non-terminated open condition, or a terminated condition connected to a termination load.

22. The apparatus of any preceding embodiment, wherein termination state of said antenna of the microwave link is modulated between multiple different antenna configurations.

23. The apparatus of any preceding embodiment, wherein said multiple antenna configurations comprise connection of said antenna as a first antenna segment, with a modulated connection to a second antenna segment.

24. The apparatus of any preceding embodiment, wherein said microwave transmitter of said wireless base-station is configured for being supplied a microwave signal source which is either modulated with outgoing data to be received by the microwave link, or left unmodulated without outgoing data to be received by the microwave link.

25. The apparatus of any preceding embodiment, wherein said wireless communication by said wireless base-station is selected from a group of wireless communication types consisting of Wi-Fi, WLAN, Bluetooth, and Cellular communications.

26. The apparatus of any preceding embodiment, wherein said transmitter of said wireless base-station is configured to transmit continuous wave (CW) power at a microwave frequency which will be modulated by the reflection-based data-link, whose reflected signals are received at the receiver of said wireless base-station.

27. The apparatus of any preceding embodiment, wherein said wireless base-station is configured for communicating with the microwave link which is placed at, coupled to, or integrated within a wearable electronic device.

28. The apparatus of any preceding embodiment, wherein said wireless base-station is configured for communicating with the microwave link which is configured for modulating an amount of phase change exhibited in its different termination states, and reflecting a signal back to the receiver of said wireless base-station.

29. A method for wirelessly communicating data between a base-station and a remote link, comprising: (a) generating a microwave illumination from a transmitter output of a base-station toward a remote link; (b) coupling a portion of said transmitter output, adjusted for phase and/or attenuation, to a receiver input of the base-station, to partially or fully reject ambient reflections received from background objects at the receiver input; (c) modulating reflection of the antenna of the remote link whereby the remote link encodes data being communicated to the base-station; and (d) extracting data encoded in modulated reflections from the remote link.

30. The method of any preceding embodiment, further comprising monitoring power output of the base-station receiver, which is used by said base-station to determine when phase and attenuations adjustments have maximized rejection of ambient reflections from background objects.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A wireless base-station apparatus which cancels ambient reflection blocker signals of a reflection-based data-link, the apparatus comprising:
    (a) a transmitter of a wireless base-station, said transmitter having a transmitter antenna output for being directed to a reflection-based data link;
    (b) a receiver of said wireless base-station, said receiver having a receiver antenna input configured for receiving modulated reflections of the transmitter antenna output from the reflection-based data-link configured for communicating data back to said wireless base-station;
    (c) a circuit pathway in said wireless base-station between said transmitter antenna output and said receiver antenna input, with said circuit pathway having a programmable phase delay in series with a variable attenuator;
    (d) a control circuit configured for outputting a control signal to the programmable phase delay circuit for adjusting the phase of said programmable phase delay, and outputting a control signal to said variable attenuator to control attenuation of said variable attenuator to couple a signal into said receiver which compensates for ambient reflections received on said receiving antenna, in response to receipt of detected power at the receiver output;
    (f) whereby said wireless base-station apparatus amplifies modulated reflections from the reflection-based data-link while rejecting ambient reflection blocker signals.

2. The apparatus as recited in claim 1, wherein said circuit pathway is connected to said receiver antenna input through a power or signal combiner.

3. The apparatus as recited in claim 1, wherein said circuit pathway can be adjusted either manually, or through monitoring output power of said receiver.

4. The apparatus as recited in claim 1, further comprising a power detector configured for monitoring power output of said receiver to determine extent of the ambient reflection blocker signals in adjusting said circuit pathway rejecting these ambient reflection blocker signals.

5. The apparatus as recited in claim 1, wherein by adjusting phase and attenuation or gain, a signal can be introduced to said receiver antenna input with an amplitude approximately matching that of the ambient reflection blocker signals, yet having a phase difference of approximately 180 degrees, whereby the signal introduced to said receiver antenna input cancels all or a portion of the ambient reflection blocker signal.

6. The apparatus as recited in claim 1, wherein the reflection-based data-link is configured for communicating data back to said wireless base-station without requiring a power amplifier to drive an output transmission, as these output transmissions are driven in response to a state of termination of an antenna of the reflection-based data-link which determines extent to which signals from the reflection-based data-link are reflected back to be received by said wireless base-station.

7. The apparatus as recited in claim 6, wherein termination state of the antenna of the reflection-based data-link is modulated between a non-terminated open condition, or a terminated condition connected to a termination load.

8. The apparatus as recited in claim 7, wherein termination state of said antenna of the reflection-based data-link is modulated between multiple different antenna configurations.

9. The apparatus as recited in claim 8, wherein said multiple antenna configurations comprise connection of said antenna as a first antenna segment, with a modulated connection to at least a second antenna segment.

10. The apparatus as recited in claim 1, wherein said transmitter of said wireless base-station is configured for being supplied a microwave signal source which is either modulated with outgoing data to be received by the reflection-based data-link, or left unmodulated without outgoing data to be received by the reflection-based data-link.

11. The apparatus as recited in claim 1, wherein said wireless communication by said wireless base-station is selected from a group of wireless communication types consisting of Wi-Fi, WLAN, Bluetooth, and Cellular communications.

12. The apparatus as recited in claim 1, wherein said transmitter of said wireless base-station is configured to transmit continuous wave (CW) power at a microwave frequency which will be modulated by the reflection-based data-link, whose reflected signals are received at the receiver of said wireless base-station.

13. The apparatus as recited in claim 1, wherein said wireless base-station is configured for communicating with the reflection-based data-link which is placed at, coupled to, or integrated within a wearable electronic device.

14. The apparatus as recited in claim 1, wherein said wireless base-station is configured for communicating with the reflection-based data-link which is configured for modulating an amount of phase change exhibited in its different termination states, and reflecting a signal back to the receiver of said wireless base-station.

15. An apparatus for wirelessly communicating data with a remote link, comprising:
 (a) a microwave base-station having a microwave transmitter coupled to a transmitting antenna and a microwave receiver coupled to a receiving antenna;
 (b) wherein said microwave transmitter is configured for generating a microwave illumination toward a remote link comprising a microwave link, and for receiving a signal reflected from the microwave link which modulates signal reflection level and/or phase to encode data within the reflected signal;
 (c) a reverse blocking circuit connected between said transmitting antenna and said receiving antenna, said reverse blocking circuit configured for extracting a portion of the transmitted output, changing its phase and attenuation, to then combine this at the receiving antenna side with the reflected signal received at the receiving antenna; and
 (d) a control circuit configured for adjusting the phase and attenuation in said reverse blocking circuit to produce a signal into the receiver which compensates for ambient reflections received on the receiving antenna as a blocking signal, thus allowing the receiver to amplify modulated reflections from the microwave link while rejecting the blocking signal.

16. The apparatus as recited in claim 15, wherein said reverse blocking circuit comprises a variable phase shifter in series with a variable attenuator.

17. The apparatus as recited in claim 16, wherein said variable phase shifter in series with said variable attenuator of said reverse blocking circuit are connected to the receiver antenna input through a power or signal combiner, which is configured to combine the signal from the reverse blocking signal with that being received from the receiver antenna.

18. The apparatus as recited in claim 15, wherein said reverse blocking circuit can be adjusted either manually, or through monitoring output power of the microwave receiver.

19. The apparatus as recited in claim 15, further comprising a power detector configured for monitoring power output of the microwave receiver in the base-station to aid in adjusting the reverse blocking circuit to maximize rejection of ambient reflection blocker signals.

20. The apparatus as recited in claim 15, wherein the microwave link is configured for communicating data back to said wireless base-station without requiring a power amplifier to drive an output transmission of the microwave link, because output transmissions are driven in response to state of termination of the antenna of the microwave link which is sensed in the reflected signal reaching said microwave receiver of said wireless base-station.

21. The apparatus as recited in claim 20, wherein termination state of the antenna of the microwave link is modulated between a non-terminated open condition, or a terminated condition connected to a termination load.

22. The apparatus as recited in claim 21, wherein termination state of said antenna of the microwave link is modulated between multiple different antenna configurations.

23. The apparatus as recited in claim 22, wherein said multiple antenna configurations comprise connection of said antenna as a first antenna segment, with a modulated connection to a second antenna segment.

24. The apparatus as recited in claim 15, wherein said microwave transmitter of said wireless base-station is configured for being supplied a microwave signal source which is either modulated with outgoing data to be received by the microwave link, or left unmodulated without outgoing data to be received by the microwave link.

25. The apparatus as recited in claim 15, wherein said wireless communication by said wireless base-station is selected from a group of wireless communication types consisting of Wi-Fi, WLAN, Bluetooth, and Cellular communications.

26. The apparatus as recited in claim 15, wherein said transmitter of said wireless base-station is configured to transmit continuous wave (CW) power at a microwave frequency which will be modulated by the reflection-based data-link, whose reflected signals are received at the receiver of said wireless base-station.

27. The apparatus as recited in claim 15, wherein said wireless base-station is configured for communicating with the microwave link which is placed at, coupled to, or integrated within a wearable electronic device.

28. The apparatus as recited in claim 15, wherein said wireless base-station is configured for communicating with the microwave link which is configured for modulating an amount of phase change exhibited in its different termination states, and reflecting a signal back to the receiver of said wireless base-station.

29. A method for wirelessly communicating data between a base-station and a remote link, comprising:
 (a) generating a microwave illumination from a transmitter output of a base-station toward the remote link;

(b) coupling a portion of said transmitter output, adjusted for phase and/or attenuation, to a receiver input of the base-station, to partially or fully reject ambient reflections received from background objects at the receiver input;
(c) modulating reflection of the antenna of the remote link whereby the remote link encodes data being communicated to the base-station; and
(d) extracting data encoded in modulated reflections from the remote link.

30. The method as recited in claim 29, further comprising monitoring power output of the base-station receiver, which is used by said base-station to determine when phase and attenuations adjustments have maximized rejection of ambient reflections from background objects.

* * * * *